United States Patent
Crom

[11] 3,710,333
[45] Jan. 9, 1973

[54] INTERFEROMETER DIRECTION FINDER ANTENNA COMPENSATION

[75] Inventor: Carol L. Crom, Garland, Tex. 75042
[73] Assignee: E-System, Inc., Dallas, Tex.
[22] Filed: Sept. 27, 1971
[21] Appl. No.: 184,114

[52] U.S. Cl.................343/114, 343/113 R, 343/895
[51] Int. Cl................................................G01s 3/10
[58] Field of Search...343/114, 113 R, 829, 705, 895

[56] References Cited

UNITED STATES PATENTS

| | | | |
|---|---|---|---|
| 3,553,698 | 12/1968 | Keller | 343/114 X |
| 3,035,265 | 11/1960 | Ziehm et al. | 343/113 R |
| 3,013,265 | 12/1961 | Wheeler | 343/114 |

Primary Examiner—Benjamin A. Borchelt
Assistant Examiner—Aristotelis M. Psitos
Attorney—James D. Willborn et al.

[57] ABSTRACT

An interferometer direction finder antenna mounted in a protective pod receives phase error producing energy resulting from current induced in the pod generating a magnetic field. To compensate for and minimuze the effects of this extraneous energy, a sensor is located on the pod and oriented to produce a current related to the magnetic field generated by the pod current. A direction finder system employs at least two radio wave energy responsive antennas and each of the antennas has associated therewith a separate sensor. To minimize the pod current error in the wave front signal a current from the sensor associated with the first antenna is combined with a wave front signal from the second antenna. Similarly, the current signal from the sensor of the second antenna is combined with the wave front signal from the first antenna. Signals from each of the combining circuits are used in standard direction finder computing receivers to determine the location of a transmitting source relative to the direction finder antennas.

7 Claims, 8 Drawing Figures

INVENTOR:
CAROL L. CROM

PATENTED JAN 9 1973 3,710,333

INVENTOR:
CAROL R. CROM

INTERFEROMETER DIRECTION FINDER ANTENNA COMPENSATION

This invention relates to direction finder systems, and more particularly to compensating a wave front signal for extraneous developed current in an interferometer direction finder antenna system.

An interferometer direction finder system derives signal direction information by determining the relative phase delay of the electromagnetic energy at two or more points on a known base line as the electromagnetic wave front passes the base line. In such a direction finder system, two or more antennas are accurately positioned along the base line to be responsive to the passing electromagnetic wave front. Wave front signals from each of the antennas is applied to computer circuitry for determining the angle of the electromagnetic energy passing the base line. This angle then determines the line of bearing of the transmitter generating the electromagnetic energy. The accuracy of such a system depends on how well the output from the antennas phase track the wave front being monitored.

A source of considerable phase error is the interaction between several antennas on the base line or between the antennas and nearby conductors. In general, phase errors are caused from nearby conducting surfaces such as supporting ground planes, transmission lines and other metal objects. These phase errors are the result of currents induced in the surrounding metal objects that produce induction and radiation fields which, when combined with the fields of the passing electromagnetic waves result in a distortion of the wave front in the vicinity of the antennas.

Fields from induced currents produce two effects upon direction finding equipment:

1. A deviation in the apparent direction from which the passing wave seems to arrive (known to those familiar with direction finder systems, as quadrantal error) and 2. A quadrature effect caused by two fields 90° out of time phase with those of the passing wave.

Interaction between the several antennas on the base line and the ground plane used to support the antennas is a major problem area. This is particularly true when the dimensions of the ground plane are such as to become resonant within the operating frequency range of the interferometer direction finder system. Typically, airborne interferometer direction finder antennas are mounted in metallic aerodynamic shaped pods. These pods provide a reasonably long interferometer base line and also provide the fineness ratio required for efficient air travel; that is, they are aerodynamically designed. Practical lengths of the mounting pods are comparable to wavelengths in the VHF frequency range and are therefore resonant at one or more frequencies within this range. Skin current distribution on the conducting surface of the pod is highly dependent on the pod dimension as well as the direction of signal arrival. Direction finder antennas located along a longitudinal axis of such pods will interact with the skin current and will be mutually coupled to the pod. Large phase tracking errors can result from this interaction.

Heretofore, there have been many different systems for correcting quadrantal error, such as: by the use of a correction curve for the apparatus and by employing some mechanical arrangement involving an adjustable cam to compensate for the error.

In accordance with the present invention, in an interferometer direction finder system quadrantal error is compensated by employing a first direction finder antenna for receiving signal direction radio wave energy. A first sensor responsive to a magnetic field resulting from current signals induced in a nearby conductor and mutually coupled to said first antenna is located in the vicinity of this first antenna. A second direction finder antenna, along the same base line as the first antenna, also receives signal direction radio wave energy. In the same general location as the second antenna is a second sensor responsive to a magnetic field resulting from current signals induced in a nearby conductor and mutually coupled to the second antenna. Connected to the first antenna and the second sensor is a circuit responsive to signals generated by the antenna and sensor to generate a corrected wave front signal from a combination of the two applied inputs. Similarly, the second antenna and the first sensor are connected to a circuit for combining signals from the antenna and sensor to thereby generate a second corrected wave front signal.

A more complete understanding of the invention and its advantages will be apparent from the specification and claims and from the accompanying drawings illustrative of the invention.

Referring to the drawings.

Although the invention will be primarily described with application to airborne interferometer systems, it should be understood that it may also be applicable to ground or ship based systems where the antenna size is restricted. Furthermore, the system is directly adaptable to any type of polarization of the electromagnetic wave although only circularly polarization antennas will be illustrated.

Figure 1:
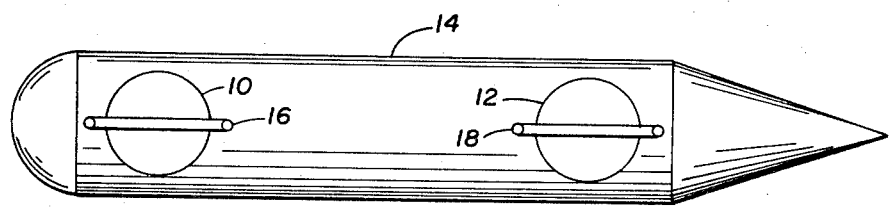
FIG. 1 is a plan view of an elongated pod supporting two direction finder antennas along a longitudinal axis with compensating sensors located at each antenna.

Referring to FIG. 1, there is shown direction finder antennas 10 and 12 mounted in an elongated pod 14. Typically, the elongated pod 14 when used with an aircraft has a design configured to minimize the resistance to air flow. Such a pod may be located at the end of one wing of an aircraft. This location is selected to minimize phase error signals at the antennas 10 and 12 from the fuselage of the aircraft. The pod 14 is usually constructed from one of the various light weight metals and as such, it will be a conductor of induced currents from the passage of an electromagnetic wave therethrough. These induced currents (skin currents) generate a magnetic field at the antennas 10 and 12 that in many cases is greater than the incoming energy wave from a source to be located. To compensate for the phase error from the induced current, a compensating sensor 16 is mounted to the pod 14 to extend over the antenna 10 and a compensating sensor 18 is also mounted to the pod to extend over the antenna 12.

Figure 2:
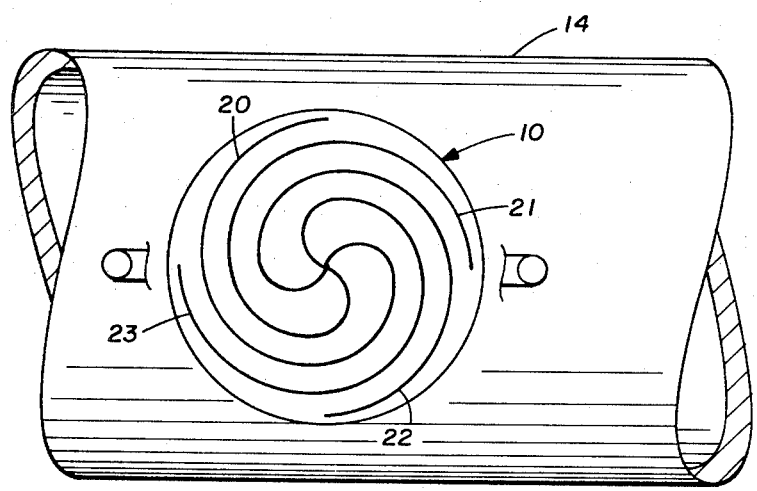
FIG. 2 is a plan view of a portion of the pod of FIG. 1 showing a circularly polarized direction finder antenna.
Figure 3:
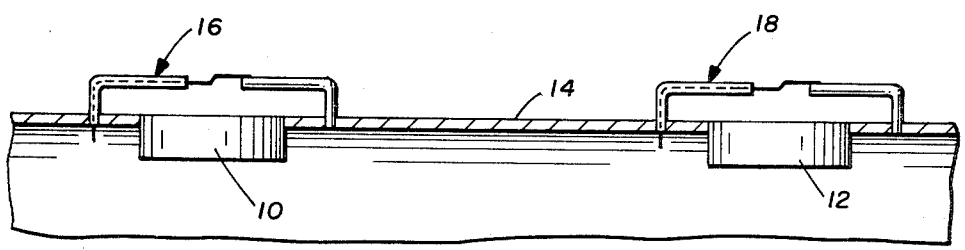
FIG. 3 is a sectional view of a portion of the elongated pod taken through the direction finder antennas.
Figure 4:
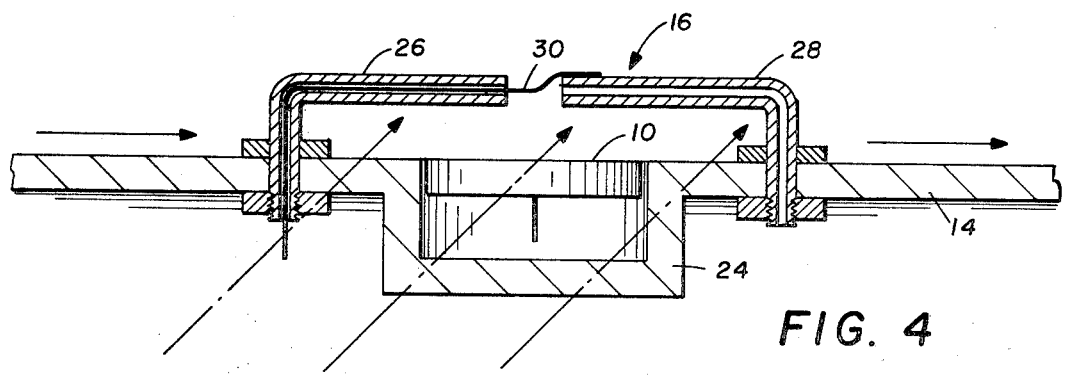
FIG. 4 is an expanded view in section of one of the direction finder antennas and the associated compensating sensor.

Referring to FIG. 2, 3 and 4, the antennas 10 and 12 may be circularly polarized and the compensating sensors 16 and 18 linearly polarized. In FIG. 2 there is illustrated an enlarged view of the antenna 10 having four spiral elements 20–23. As shown in FIG. 4, the antenna 10 is mounted flush with the surface of the pod 14 in an enclosing well 24.

The compensating sensor 16 comprises a shielded cable 26 and a conductor 28. The shield of the cable 26 is electrically grounded to the conductive skin of the pod 14 as is the conductor 28. The conductor 30 of the cable 26 is electrically connected to the conductor 28 in an area approximately at the center of the antenna 10.

The spaced relationship between the antennas 10 and 12 and the associated compensating sensors 16 and 18 is illustrated in FIG. 3. The compensating sensor 18 is similar to the sensor 16 and includes a shielded cable half-loop. The half-loop comprises a shielded cable section with the shield connected to the pod 14 and the cable connected to a conductor, also grounded to the pod skin.

With the system illustrated in FIGS. 1–4, errors introduced into the signals from the antennas 10 and 12 are compenstated along a given polarized axis by the linearly polarized compensating sensors 16 and 18, as will be described. The compensating axis will be in line with the longitudinal axis of the pod 14, which is also the base line of the antennas 10 and 12. This is the main direction for the source of error in the phase direction signal from the antennas. To compensate for errors induced from along other axes, additional linearly polarized compensating sensors are located on the outer surface of the pod 14. The orientation of such sensors will be determined by the direction of the error currents.

In operation of the present invention, an electromagnetic field passing over the metallic skin of the elongated pod 14 induces a skin current. This skin current generates an electromagnetic wave surrounding the pod 14 which is sensed by the antennas 10 and 12. This magnetic field will be sensed along with the electromagnetic wave emitting from a source the position of which is to be determined by the direction finder system coupled to receive signals from the antennas 10 and 12. With both the desired electromagnetic wave and the induced electromagnetic wave passing through the antennas, the generated wave front signal from each antenna will include a phase error. To minimize this phase error, the compensating sensors 16 and 18 are positioned in the magnetic field surrounding the pod 14. Each of the compensating sensors 16 and 18, as best illustrated in FIG. 4, forms a half-loop with the conductive skin of the pod 14. An electromagnetic field passing through the half-loop, as indicated by the field strength lines of FIG. 4, will induce a current in the compensating sensors. This sensor current is related to the skin current and when combined with the output of the direction finder antennas compensates for the magnetic field coupling both the sensor and the antenna.

Figure 5:
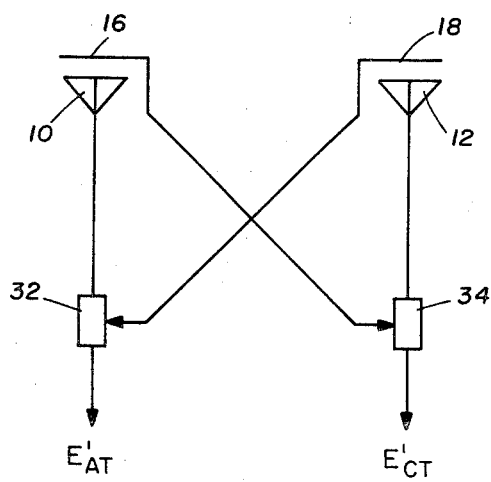
FIG. 5 is a schematic of a system for compensating quadrantal error using compensating sensors in accordance with the present invention.

Referring to FIG. 5, there is shown a schematic of a system for combining the compensating sensor current with the direction finder antenna wave front signals. The antenna 10 is connected to a signal combiner 32 which has a second input connected to the compensating sensor 18. A similar signal combiner 34 has one input connected to the antenna 12 and a second input connected to the compensating sensor 16. To avoid introducing phase delay between the two signals applied to each of the signal combiners, the shielded cable connecting the signal combiners to the respective antenna and compensating sensor are sized to conform to a particular installation.

Figure 7:
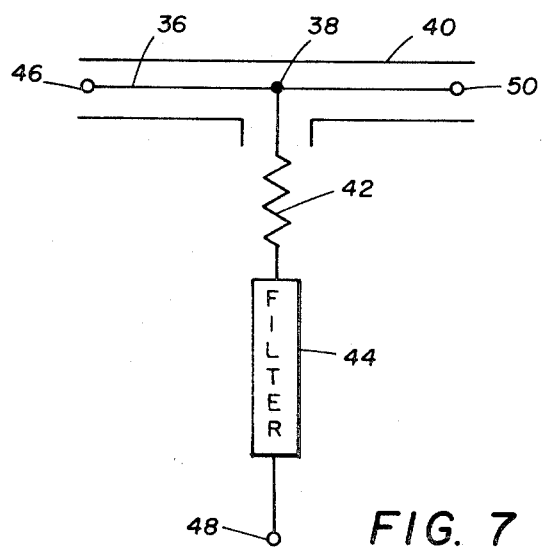
FIG. 7 is a schematic of a typical combiner circuit for use in the system of FIG. 5.

Although the signal combiner may comprise any one of several circuits, a typical circuit is illustrated in FIG. 7. The circuit shown is a shielded stub-line including a conductor 36 tapped at a center point 38. A shield 40 encloses the conductor 36. Connected to the tap 38 is a resistor 42 and a filter 44. A signal from the direction finder antenna is connected to a terminal 46 and a signal from the compensating sensor is connected to a terminal 48. The combination of these two signals appears as an output at a terminal 50.

Without the compensating sensors, a direction finder antenna system having antennas 10 and 12 responsive to an electromagnetic wave front will produce large phase tracking errors resulting from an interaction at the antennas of a source generated electromagnetic wave and an electromagnetic wave generated by current induced in the pod 14.

Figure 6A:
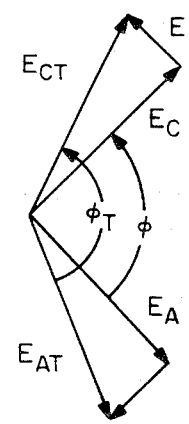
FIGS. 6a and 6b are vector diagram presentations of antenna voltage components.

Referring to FIG. 6a, there is shown a vector representation of the interaction of the various electromagnetic waves in terms of various signal components. Vector $E_c$ represents the wave front voltage from the antenna 12 and the vector $E_a$ represents the wave front voltage from the antenna 10. These voltages will be present at the terminals of the antennas 10 and 12, respectively, if no phase errors existed.

Without the compensating sensors of the present invention, phase errors will exist and the vector $E_{pc}$ represent the error voltage component due to the interaction on the antenna 12 as a result of pod currents. Vector $E_{pa}$ represents the error voltage component due to the interaction on the antenna 10 as a result of pod currents. The resulting terminal voltages at the antennas 10 and 12 are given by the vectors $E_{at}$ and $E_{ct}$.

The correct angle at which the desired electromagnetic wave front passes through the antennas 10 and 12 is given by the angle between the vectors $E_c$ and $E_a$. However, due to the induced current in the skin of the pod 14 and the interaction on the antennas 10 and 12, the actual angle information on the wave front signal is given by the angle between the vectors $E_{ct}$ and $E_{at}$. Thus, it can be seen that a considerable phase error exists.

Figure 6B:
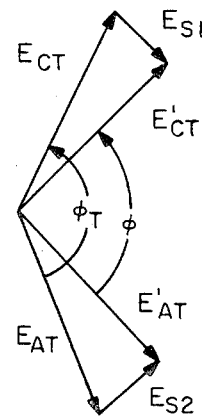

Referring to FIG. 6b, there is again shown the vectors $E_{at}$ and $E_{ct}$ representing the generated wave front signal from the antennas 10 and 12, respectively, with the interaction of the incoming electromagnetic wave front and the pod current generated electromagnetic wave producing a phase error. To compensate for this phase error, a voltage as represented by the vector $E_{s2}$ is added to the voltage $E_{at}$. This vector addition results in the vector $E'_{at}$, which represents a compensated wave front signal from the signal combiner 32. Similarly, to compensate for the error in the wave front signal from the antenna 12, a voltage represented by the vector $E_{s1}$ is added to the voltage represented by the vector $E_{ct}$. This results in a voltage as represented by the vector $E'_{ct}$ which is the compensated wave front signal at the output of the signal combiner 34. The result is a signal at the output of the signal combiner 32, as represented by the vector $E'_{at}$, having a phase angle with the signal at the output of the combiner 34, as represented by the vector $E'_{ct}$, substantially equal to the angle between the vectors $E_a$ and $E_c$, representing the correct phase angle for a wave front passing through the antennas 10 and 12 at an angle $\phi$, that is, $\phi$ is approximately equal to $\phi_0$, where $\phi_0$ is the angle between the vectors $E'_{at}$ and $E'_{ct}$.

Because of the phase angle of the voltages at compensator sensors 16 and 18, to compensate for phase errors at the antennas 10 and 12, the sensor signals are crossed while combining with the antenna signals. That is, the wave front correction signal of the compensating sensor 16 is combined with the wave front signal from the antenna 12 and the wave front signal from the compensating sensor 18 is combined with the wave front signal from the antenna 10. Where more than two direction finder antennas are employed, the interconnection of the compensating sensor with an antenna is determined by the phase angle of the generated signals. The prime consideration is the compensation of the antenna wave front signal for a phase error.

In the usual manner, the signals at the output of the signal combiners 32 and 34 are connected to interferometer receiver amplifiers and computer circuitry for processing to determine the direction of the incoming wave front. To minimize additional phase error such circuitry is physically located within the pod 14 to reduce cable length.

While only one embodiment of the invention, together with modifications thereof, has been described in detail herein and shown in the accompanying drawings, it will be evident that various other modifications are possible without departing from the scope of the invention.

What is claimed is:

1. In an interferometer direction finder system comprising:
    a first direction finder antenna receiving signal direction radio wave energy,
    a first sensor responsive to a magnetic field resulting from current signals induced in a nearby conductor and mutually coupled to said first antenna,
    a second direction finder antenna receiving signal direction radio wave energy,
    a second sensor responsive to a magnetic field resulting from current signals induced in a nearby conductor and mutually coupled to said second antenna,
    means connected to said first antenna and said second sensor and responsive to signals generated thereby to generate a corrected wave front signal by combining the antenna and sensor signals, and
    means connected to said second antenna and said first sensor and responsive to signals generated thereby to generate a corrected wave front signal by combining the antenna and sensor signals.

2. In an interferometer direction finder system as set forth in claim 1 wherein said first and second sensors comprise a shielded cable half-loop oriented in a direction substantially parallel to the base line of the first and second antennas.

3. In an interferometer direction finder system as set forth in claim 1 wherein said direction finder antennas are circularly polarized and said sensors are linearly polarized.

4. In an interferometer direction finder system comprising:
    a first direction finder antenna receiving signal direction radio wave energy and generating a wave front signal,
    a second direction finder antenna receiving signal direction radio wave energy and generating a second wave front signal,
    a pod having said antennas mounted therein along a longitudinal base line axis,
    a first sensor mounted to said pod and responsive to a magnetic field resulting from current signals induced therein and mutually coupled to said first antenna, said first sensor generating a wave front correction signal,
    a second sensor mounted to said pod and responsive to a magnetic field resulting from current signals induced therein and mutually coupled to the second antenna, said second sensor generating a second wave front correction signal,
    means connected to said first antenna and said second sensor and responsive to the signals generated thereby to produce a corrected wave front signal by combining the antenna and sensor signals, and
    means connected to said second antenna and said first sensor and responsive to signals generated thereby to produce a corrected wave front signal by combining the antenna and sensor signals.

5. In an interferometer direction finder system as set forth in claim 4 wherein said first and second sensors comprise a shielded cable half-loop oriented in a direction substantially parallel to the base line of the first and second antennas.

6. In an interferometer direction finder system as set forth in claim 5 wherein said first and second sensors overlie said first and second antennas, respectively, along the longitudinal mounting axis for said antennas.

7. In an interferometer direction finder system as set forth in claim 6 wherein said first and second sensors are linearly polarized.

* * * * *